US011716622B2

(12) United States Patent
Sloane (10) Patent No.: US 11,716,622 B2
(45) Date of Patent: Aug. 1, 2023

(54) SYSTEM FOR IDENTIFICATION OF SECURE WIRELESS NETWORK ACCESS POINTS USING CRYPTOGRAPHIC PRE-SHARED KEYS

(71) Applicant: BANK OF AMERICA CORPORATION, Charlotte, NC (US)

(72) Inventor: Brandon Sloane, Indian Land, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 157 days.

(21) Appl. No.: 17/380,473

(22) Filed: Jul. 20, 2021

(65) Prior Publication Data

US 2023/0023649 A1    Jan. 26, 2023

(51) Int. Cl.
G06F 21/60 (2013.01)
H04W 12/06 (2021.01)
H04W 12/069 (2021.01)
H04W 76/11 (2018.01)
H04W 12/0431 (2021.01)
H04W 12/122 (2021.01)

(52) U.S. Cl.
CPC ........ *H04W 12/069* (2021.01); *G06F 21/602* (2013.01); *H04W 12/0431* (2021.01); *H04W 12/122* (2021.01); *H04W 76/11* (2018.02)

(58) Field of Classification Search
CPC ........... H04W 12/069; H04W 12/0431; H04W 12/122; H04W 76/11; G06F 21/602
See application file for complete search history.

(56) References Cited

U.S. PATENT DOCUMENTS

| | | |
|---|---|---|
| 7,233,664 B2 | 6/2007 | Soliman |
| 7,594,113 B2 | 9/2009 | Tan et al. |
| 7,607,015 B2 | 10/2009 | Fascenda |
| 7,624,267 B2 | 11/2009 | Huang et al. |
| 7,676,216 B2 | 3/2010 | Stieglitz et al. |
| 7,721,325 B2 | 5/2010 | Lee et al. |
| 7,734,280 B2 | 6/2010 | Eastlake, III |
| 7,804,807 B2 | 9/2010 | Korus et al. |
| 7,827,409 B2 | 11/2010 | Fascenda |
| 7,881,474 B2 | 2/2011 | Sun |
| 7,986,940 B2 | 7/2011 | Lee et al. |
| 8,000,478 B2 | 8/2011 | Wong et al. |
| 8,107,630 B2 | 1/2012 | Oh et al. |
| 8,176,328 B2 | 5/2012 | Chen et al. |
| 8,331,567 B2 | 12/2012 | Yao |
| 8,429,404 B2 | 4/2013 | Greenstein et al. |
| 8,555,344 B1 | 10/2013 | Wiedmann et al. |
| 8,559,642 B2 | 10/2013 | Wurm |
| 8,578,159 B2 | 11/2013 | Emeott et al. |
| 8,924,716 B2 | 12/2014 | Miyabayashi et al. |

(Continued)

*Primary Examiner* — Izunna Okeke
(74) *Attorney, Agent, or Firm* — Moore & Van Allen PLLC; Seongun M. Hong (57) ABSTRACT

A system is provided for identification of secure wireless network access points using cryptographic pre-shared keys. In particular, the system may comprise a client-side application that may use a pre-shared key to generate a list of valid access point ID's in a pseudorandom manner. A server-side application may use the same pre-shared key to generate one or more access point ID's. Based on the pre-shared key, a client computing device may readily identify which wireless access points within the network are secure and trusted.

14 Claims, 2 Drawing Sheets

(56) References Cited

U.S. PATENT DOCUMENTS

| | | | |
|---|---|---|---|
| 8,983,066 B2 | 3/2015 | Kruys et al. | |
| 9,197,420 B2 | 11/2015 | Cross et al. | |
| 9,451,460 B2 | 9/2016 | Park et al. | |
| 9,553,849 B1 | 1/2017 | Smalley | |
| 9,800,554 B2 | 10/2017 | van Roermund et al. | |
| 9,826,399 B2 | 11/2017 | Peterson et al. | |
| 9,838,425 B2 | 12/2017 | Jalan et al. | |
| 9,866,558 B2 | 1/2018 | Montemurro et al. | |
| 10,285,059 B2 | 5/2019 | Cohen et al. | |
| 10,469,495 B2 | 11/2019 | Hardy et al. | |
| 2008/0046732 A1 | 2/2008 | Fu et al. | |
| 2009/0019283 A1* | 1/2009 | Muralidharan | H04W 12/0433 |
| | | | 713/168 |
| 2009/0119760 A1* | 5/2009 | Hung | H04W 12/069 |
| | | | 726/6 |
| 2013/0101121 A1 | 4/2013 | Nordholt et al. | |
| 2021/0282014 A1* | 9/2021 | Johnston | H04W 12/122 |

* cited by examiner

SYSTEM FOR IDENTIFICATION OF SECURE WIRELESS NETWORK ACCESS POINTS USING CRYPTOGRAPHIC PRE-SHARED KEYS

FIELD OF THE INVENTION

The present disclosure embraces a system for identification of secure wireless network access points using cryptographic pre-shared keys.

BACKGROUND

There is a need for an effective way to identify secure wireless access points in a network.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for identification of secure wireless network access points using cryptographic pre-shared keys. In particular, the system may comprise a client-side application that may use a pre-shared key to generate a list of valid access point ID's in a pseudorandom manner. A server-side application may use the same pre-shared key to generate one or more access point ID's. Based on the pre-shared key, a client computing device may readily identify which wireless access points within the network are secure and trusted.

Accordingly, embodiments of the present disclosure provide a system for identification of secure wireless network access points using cryptographic pre-shared keys, the system comprising a memory device with computer-readable program code stored thereon; a communication device; and a processing device operatively coupled to the memory device and the communication device, wherein the processing device is configured to execute the computer-readable program code to generate a client-side list of one or more secure wireless identifiers by inputting a pre-shared key into a cryptographic function; detect that one or more wireless identifiers are being broadcasted; identify a secure wireless identifier using the client-side list of one or more secure wireless identifiers; and automatically connect to a secure wireless access point through the secure wireless identifier.

In some embodiments, the computer-readable program code, when executed, further causes the processing device to execute a secure handshake process for retrieving the pre-shared key, comprising connecting to a guest wireless network through a guest wireless identifier; transmitting authentication data to an authentication server; and receiving the pre-shared key from the authentication server.

In some embodiments, the one or more wireless identifiers comprises one or more decoy wireless identifiers and one or more unsecured wireless identifiers.

In some embodiments, the decoy wireless identifier causes computing devices to connect to a decoy wireless network, wherein the decoy wireless network comprises one or more decoy resources.

In some embodiments, the one or more decoy resources comprises at least one of decoy data or decoy virtual environments.

In some embodiments, the decoy wireless network is further configured to generate a log of network interactions of the computing devices within the decoy wireless network.

In some embodiments, the one or more wireless identifiers comprises one or more service set identifiers ("SSID").

Embodiments of the present disclosure also provide a computer program product for identification of secure wireless network access points using cryptographic pre-shared keys, the computer program product comprising at least one non-transitory computer readable medium having computer-readable program code portions embodied therein, the computer-readable program code portions comprising executable code portions for generating a client-side list of one or more secure wireless identifiers by inputting a pre-shared key into a cryptographic function; detecting that one or more wireless identifiers are being broadcasted; identifying a secure wireless identifier using the client-side list of one or more secure wireless identifiers; and automatically connecting to a secure wireless access point through the secure wireless identifier.

In some embodiments, the computer-readable program code portions further comprise executable code portions for executing a secure handshake process for retrieving the pre-shared key, comprising: connecting to a guest wireless network through a guest wireless identifier; transmitting authentication data to an authentication server; and receiving the pre-shared key from the authentication server.

In some embodiments, the one or more wireless identifiers comprises one or more decoy wireless identifiers and one or more unsecured wireless identifiers.

In some embodiments, the decoy wireless identifier causes computing devices to connect to a decoy wireless network, wherein the decoy wireless network comprises one or more decoy resources.

In some embodiments, the one or more decoy resources comprises at least one of decoy data or decoy virtual environments.

In some embodiments, the decoy wireless network is further configured to generate a log of network interactions of the computing devices within the decoy wireless network.

Embodiments of the present disclosure also provide a computer-implemented method for identification of secure wireless network access points using cryptographic pre-shared keys, wherein the computer-implemented method comprises generating a client-side list of one or more secure wireless identifiers by inputting a pre-shared key into a cryptographic function; detecting that one or more wireless identifiers are being broadcasted; identifying a secure wireless identifier using the client-side list of one or more secure wireless identifiers; and automatically connecting to a secure wireless access point through the secure wireless identifier.

In some embodiments, the computer-implemented method further comprises executing a secure handshake process for retrieving the pre-shared key, comprising connecting to a guest wireless network through a guest wireless identifier; transmitting authentication data to an authentication server; and receiving the pre-shared key from the authentication server.

In some embodiments, the one or more wireless identifiers comprises one or more decoy wireless identifiers and one or more unsecured wireless identifiers.

In some embodiments, the decoy wireless identifier causes computing devices to connect to a decoy wireless network, wherein the decoy wireless network comprises one or more decoy resources.

In some embodiments, the one or more decoy resources comprises at least one of decoy data or decoy virtual environments.

In some embodiments, the decoy wireless network is further configured to generate a log of network interactions of the computing devices within the decoy wireless network.

In some embodiments, the one or more wireless identifiers comprises one or more service set identifiers ("SSID").

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Cryptographic function" or "cryptographic algorithm" as used herein may refer to a set of logical and/or mathematical operations or processes that may be executed on a specified segment of data to produce a cryptographic output (or "cypher"). In some embodiments, the cryptographic algorithm may be an algorithm such as Rivest-Shamir-Adleman ("RSA"), Shamir's Secret Sharing ("SSS"), or the like. In other embodiments, the cryptographic algorithm may be a hash algorithm which may, given a specified data input, produce a cryptographic hash output value which is a fixed-length character string. Examples of such hash algorithms may include MD5, Secure Hash Algorithm/SHA, or the like. According, "hashing" or "hashed" as used herein may refer to the process of producing a hash output based on a data input into a hash algorithm.

"Key" or "cryptographic key" as used herein may refer to data (e.g., a character string) which determines the manner in which an input is transformed into an output using a cryptographic algorithm (e.g., an encryption algorithm). Accordingly, "symmetric cryptography" or "symmetric key cryptography" may refer to a process for data encryption by which multiple users and/or devices use the same key to encrypt communications.

Many computing devices may use wireless interfaces and technologies to connect to a network (e.g., Wi-Fi connections). In this regard, in some embodiments, computing devices may connect to a particular wireless access point through a wireless identifier associated with the wireless access point (e.g., a service set identifier, or "SSID") of said wireless access point. That said, there is a need for a way to identify and distinguish between trusted and secure wireless access points and potentially untrusted or unsecure wireless access points.

To address such technological challenges, the system may use pre-shared cryptographic keys to identify secure wireless access points in an automated and expedient manner. In this regard, the system may comprise a client computing device having an agent application installed thereon. The agent application may generate one or more trusted (or valid) SSID names through a cryptographic function, where a pre-shared key stored on the client computing device may be used as a seed value for generating the trusted SSID names. In some embodiments, the system may use additional seed values (e.g., system time, date, hardware addresses, or the like) in addition to the pre-shared key, thereby allowing the system to generate one or multiple trusted SSID names in a pseudorandom manner.

The system may further comprise a wireless access point which may have the same pre-shared key stored thereon. The wireless access point may use the same cryptographic function, along with the same seed values (e.g., the same pre-shared key as the one stored on the client computing device) to generate a list of SSID names from the cryptographic function. In this way, the list of SSID names generated on the client side will be the same as the list of SSID names generated on the network side, thereby establishing a list of "trusted" SSID names. Using the generated list of SSID names, the wireless access point may wirelessly broadcast one or more of the trusted SSID names to the client computing device. The installed agent application on the client computing device may then detect the trusted SSID names broadcasted from the wireless access point, identify the trusted SSID names based on the client-side list of SSID names, and automatically connect to the wireless access point based on the identified trusted SSID names. In some embodiments, the SSID names may periodically change (e.g., by changing the pre-shared key and/or seed values), thereby increasing the security of the system.

In other embodiments, rather than having the pre-shared key stored on the client computing device, the system may implement an electronic handshake-based protocol for exchanging the pre-shared key. In such embodiments, the client computing device may first connect to a guest wireless network through a guest wireless identifier. Upon connection to the guest wireless network, the system may display a pseudo-trusted landing page or interface to the client computing device (e.g., via an enterprise trust proxy) through which a user of the client computing device may provide additional authentication credentials (e.g., a username and password, PIN, multi-factor authentication code, biometric data, or the like) to an authentication server. Upon authenticating the user based on the authentication credentials, the system may transmit the pre-shared key to the client computing device through the guest wireless network. Once the pre-shared key is transmitted to the client computing device, the client computing device may connect to a secure, trusted wireless access point using the process described above.

In some embodiments, the system may generate decoy SSID's which may use the same or similar naming convention as the trusted SSID's. The decoy SSID's may cause computing devices to connect to a particular wireless access point that may be configured to deploy one or more distraction measures (e.g., decoy or replacement data, virtual/sandbox environments, or the like) against potentially rogue devices or actors who may attempt to gain unauthorized access to the network. In some embodiments, the decoy wireless access point may further log the potentially unauthorized interactions to identify and track computing devices to be added to a list of potentially unauthorized entities. Depending on the actions taken by the computing device, such computing device may be excluded and/or precluded from further network access attempts.

An exemplary use case of the system is described below for illustrative purposes only and is not intended to restrict or reduce the scope of the disclosure provided herein. In one embodiment, a user (e.g., an employee of an entity) may use a client computing device (e.g., a smartphone operated by the user) to connect to a wireless network using Wi-Fi. The client computing device may, using a pre-shared key and/or additional seed values, use a cryptographic function (e.g., a hash algorithm) to generate one or more hash values that may represent the potential values for trusted SSID names. Meanwhile, a wireless access point controlled by the entity (e.g., a router) may use the same pre-shared key and/or additional seed values to generate a server-side list of potential SSID names. The wireless access point may then select one or more of the valid SSID names to broadcast to the client computing device. In some embodiments, the wireless access point may further broadcast one or more decoy SSID names to the client computing device.

The client computing device may, using the client-side list of trusted SSID names, automatically identify the valid SSID name from the pool of SSID names broadcasted by the wireless access point (which contains one or more valid SSID's and one or more decoy SSID's). Once the valid SSID name has been identified by the client computing device, the client computing device may automatically connect to the wireless access point using the valid SSID name. In this way, the system may allow users to securely connect to trusted wireless networks without the need to manually identify which SSID's are trusted and which SSID's are potentially unsecured.

The system as described herein confers a number of technological advantages over conventional wireless security systems. For instance, by automatically generating valid SSID names, the system is able to ensure that wireless devices selectively connect only to trusted networks without further input from the user. In turn, this increases the overall security of the entity's network, thereby reducing the chance of data or privacy loss through unauthorized activity and/or unsecured networks.

Figure 1:
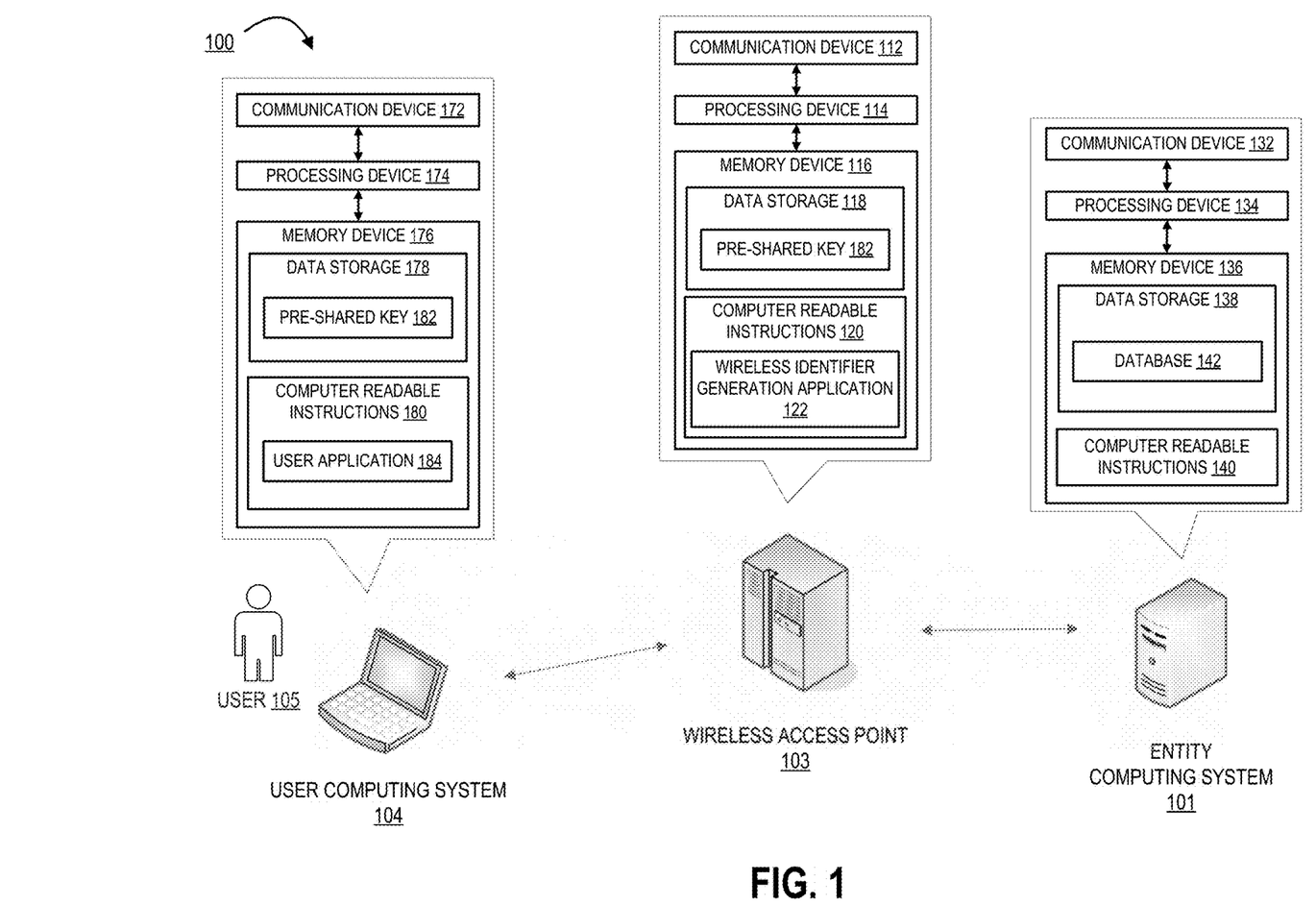
FIG. 1 illustrates an operating environment for the wireless access point identification system, in accordance with one embodiment of the present disclosure.

Turning now to the figures, FIG. 1 illustrates an operating environment 100 for the wireless access point identification system, in accordance with one embodiment of the present disclosure. In particular, FIG. 1 illustrates a wireless access point 103 that is operatively coupled, via a network, to an entity computing system 101 and/or a user computing system 104. In such a configuration, the wireless access point 103 may transmit information to and/or receive information from the entity computing system 101 and/or the user computing system 104.

It should be understood by one skilled in the art that FIG. 1 illustrates only an exemplary embodiment of the operating environment 100, and it will be appreciated that the operating environment 100 may comprise a fewer or greater number of computing systems and/or devices than are depicted in FIG. 1. For example, though FIG. 1 depicts the entity computing system 101 and user computing system 104 as singular computing systems, some embodiments may include a greater number of entity computing systems and user computing systems within the network environment. It should also be understood that one or more functions of the systems, devices, or servers as depicted in FIG. 1 may be combined into a single system, device, or server. For instance, in some embodiments, some or all of the functions of the entity computing system 101 may be performed by the wireless access point 103, or conversely, some or all of the functions of the wireless access point 103 may be performed by the entity computing system 101. Furthermore, a single system, device, or server as depicted in FIG. 1 may represent multiple systems, devices, or servers. For instance, though the wireless access point 103 is depicted as a single unit, the functions of the wireless access point 103 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the wireless access point 103 may be a networking device such as a router, network access point with wireless capabilities, or the like within the network environment which performs the secure wireless identifier generation functions as described elsewhere herein. Accordingly, the wireless access point 103 may comprise a processing device 114 operatively coupled to a communication device 112 and a memory device 116 having data storage 118 and computer readable instructions 120 stored thereon.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 may use the communication device 112 to communicate with the network and other devices on the network, such as, but not limited to the entity computing system 101 and/or the user computing system 104. Accordingly, the communication device 112 generally comprises one or more hardware components such as a modem, antennae, Wi-Fi or Ethernet adapter, radio transceiver, or other device for communicating with other devices on the network.

In some embodiments, the memory device 116 includes data storage 118 for storing data related to the system environment. In this regard, the data storage 118 may comprise a pre-shared key 182, which may be a cryptographic key used as a seed value for a cryptographic function (e.g., a hash algorithm). In this regard, the pre-shared key 182 may be used by the wireless access point 103 to generate one or more values (e.g., hash values) that represent valid wireless identifier names.

The memory device 116 may further have computer-readable instructions 120 stored thereon, where the computer-readable instructions 120 may comprise a wireless identifier generation application 122, which may comprise computer-executable program code that may instruct the processing device 114 to perform certain logic, data processing, and data storing functions of the application to accomplish the entity's objectives. For instance, the wireless identifier generation application 122 use the pre-shared key 182 as a seed value into a cryptographic function to generate a list of trusted wireless identifier names through which the user computing system 104 may connect to the network.

As further illustrated in FIG. 1, the operating environment 100 may further comprise an entity computing system 101 in operative communication with the wireless access point 103. In particular, the entity computing system 101 may be a computing system identified within the network environment that may contain a data set to be compressed using the compression algorithms described herein. Accordingly, the entity computing system 101 may be a computing system such as a server or networked terminal, though it is within the scope of the disclosure for the entity computing system 101 to be a device such as a desktop computer, laptop, IoT device, smartphone, tablet, single-board computer, or the like.

The entity computing system 101 may comprise a processing device 134 operatively coupled to a communication device 132 and a memory device 136 having data storage 138 and computer readable instructions 140 stored thereon. The data storage 138 may comprise a database 142 which may store information regarding the interactions of various computing device with the network. In particular, the database 142 may store logs of network interactions with potentially unauthorized computing devices which may have connected to a decoy wireless identifier generated by the wireless access point 103. The database 142 may further store authentication data associated with authorized users and/or computing devices such that computing devices may be authenticated for the purposes of transmitting the pre-shared key to the authorized computing devices.

In some embodiments, the operating environment 100 may further comprise a user computing system 104. The user computing system 104 may be a client computing device that may be operated by a user 105, who may be an administrator, agent, or employee of the entity. Accordingly, the user computing system 104 may be a computing device operated by the user 105, such as a laptop computer, smartphone, or the like. The user computing system 104 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like) for interacting with the user 105.

The user computing system 104 may comprise a processing device 174 operatively coupled to a communication device 172 and a memory device 176, the memory device 176 comprising data storage 178 and computer readable instructions 180. The data storage 178 of the user computing system 104 may comprise the pre-shared key 182, which is the same pre-shared key 182 stored within the data storage 118 of the wireless access point 103. As was the case for the wireless access point 103, the pre-shared key 182 may be used by the user computing system 104 to generate a client-side list of trusted wireless identifier names. To this end, the computer readable instructions 180 may comprise a user application 184 that may generate the list of trusted wireless identifier names and automatically connect to the wireless access point 103 using a trusted wireless identifier that has been broadcasted to the user computing system 104 by the wireless access point 103.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485

GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random-Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
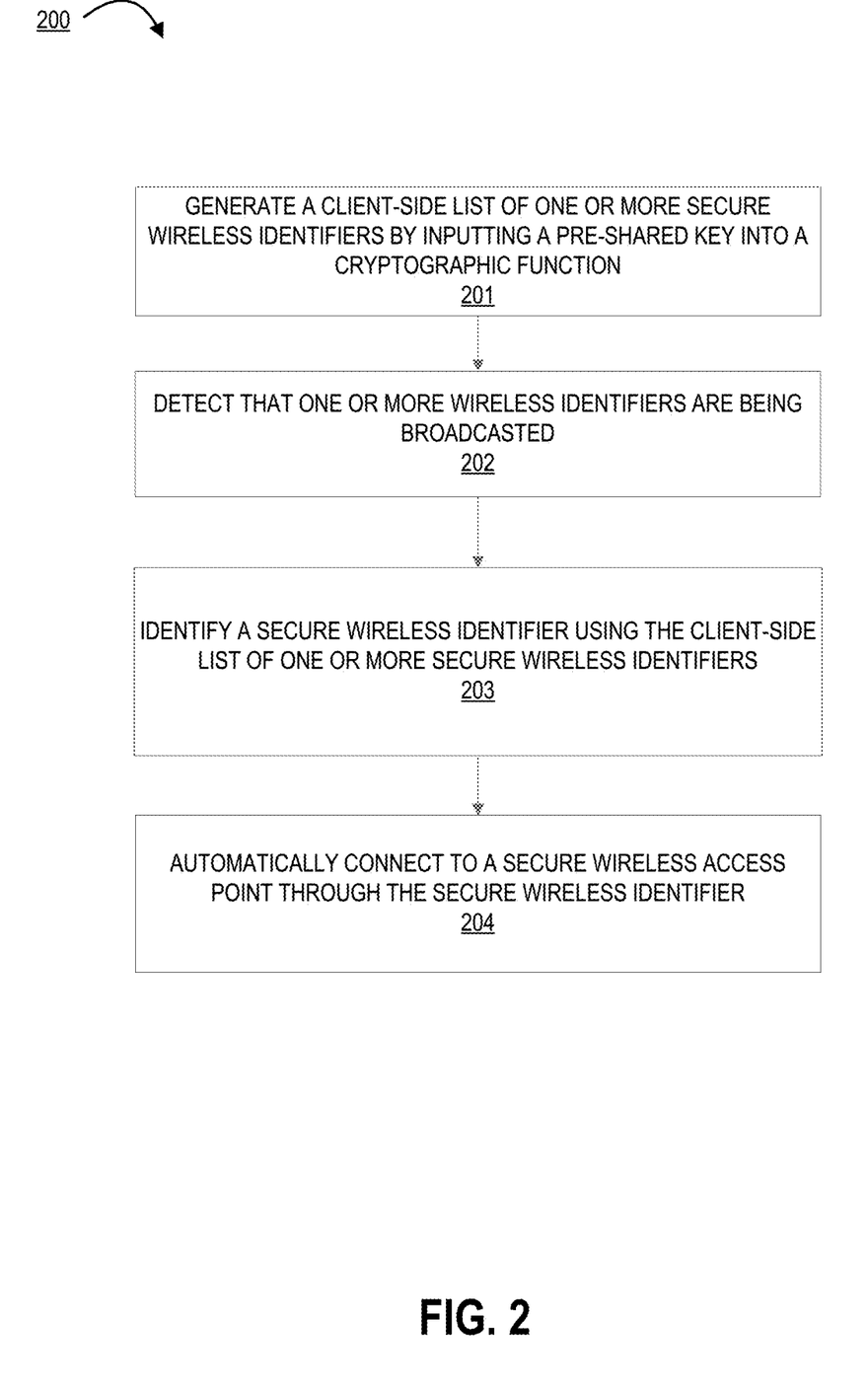
FIG. 2 illustrates a process flow for identification of secure wireless network access points using cryptographic pre-shared keys, in accordance with one embodiment of the present disclosure.

FIG. 2 illustrates a process flow 200 for identification of secure wireless network access points using cryptographic pre-shared keys, in accordance with one embodiment of the present disclosure. The process begins at block 201, where the system generates a client-side list of one or more secure wireless identifiers by inputting a pre-shared key into a cryptographic function. The pre-shared key may be a cryptographic key which may be shared among trusted devices and/or entities. Accordingly, the pre-shared key may serve as a seed value for the cryptographic function, which may be a hash algorithm such as SHA. Accordingly, the outputs of the cryptographic functions (e.g., hash values) may represent the wireless identifiers (e.g., SSID names) that may be used by trusted parties to establish a secure wireless connection. In some embodiments, additional seed values may be used in conjunction with the pre-shared key (e.g., system time) in generating the wireless identifiers. Accordingly, the list of secure wireless identifiers may change over time even if the same pre-shared key is used. In other embodiments, the wireless identifiers may change based on changing the pre-shared key at predetermined intervals (e.g., every week or month).

In an exemplary embodiment, a user who may be an employee of an entity may wish to connect to the entity's wireless network using a client computing device such as a smartphone. The smartphone may have a pre-shared key stored therein, which may be used by the smartphone to generate the client-side list of secure wireless identifiers. In some embodiments, the pre-shared key may be obtained by the smartphone by executing a secure handshake process with the wireless access point by connecting to the wireless access point through a guest wireless network. The guest wireless network may present a landing page to the smartphone which may allow the user to be authenticated with the system (e.g., by providing authentication data). Once the authentication data has been verified by the wireless access point and/or associated entity computing systems, the wireless access point may transmit the pre-shared key to the smartphone for usage in generating the client-side list of secure wireless identifiers.

The process continues to block 202, where the system detects that one or more wireless identifiers are being broadcasted. The wireless access point may use the same pre-shared key, additional seed values, and cryptographic function as those used by the client computing device to generate a server-side list of secure wireless identifiers. Because the same inputs and processes are used, the client-side list of secure wireless identifiers should be identical to the server-side list of secure wireless identifiers such that both the client computing device and wireless access point may agree on which wireless identifiers are "trusted." Accordingly, the one or more wireless identifiers broadcasted by the wireless access points may comprise one or more secure wireless identifiers. In some embodiments, the wireless access point may further be configured to broadcast one or more decoy wireless identifiers which are values that do not appear in either of the list of secure wireless identifiers. For instance, the decoy wireless identifiers may conform to the formatting conventions of the secure wireless identifiers to give the appearance of validity to potentially unauthorized computing devices. The decoy wireless identifiers may cause the client computing device to connect to a decoy wireless network that may contain one or more decoy resources (e.g., decoy data, decoy virtual environments, or the like) and/or logging mechanisms.

The process continues to block 203, where the system identifies a secure wireless identifier using the client-side list of one or more secure wireless identifiers. Using the client-side list, the client computing device may be able to discern which of the wireless identifiers being broadcasted are trusted (and thus secure) wireless identifiers and which ones may lead to potentially unsecured networks and/or decoy networks.

The process concludes at block 204, where the system automatically connects to a secure wireless access point through the secure wireless identifier. By identifying the secure wireless identifiers, the client computing device may be able to determine which wireless access point is authorized and secure for the purposes of connecting to the entity's wireless network. Furthermore, by automatically connecting the client computing device to the network via the secure wireless access point, the system may reduce the incidence of users connecting to potentially rogue networks, which in turn may reduce the incidence of sensitive data loss and/or device compromise within the entity's network.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for identification of secure wireless network access points using cryptographic pre-shared keys, the system comprising:
   a memory device with computer-readable program code stored thereon;
   a communication device; and
   a processing device operatively coupled to the memory device and the communication device, wherein the processing device is configured to execute the computer-readable program code to:
      generate a client-side list of one or more secure wireless identifiers by inputting a pre-shared key into a cryptographic function;
      detect that one or more wireless identifiers are being broadcasted, wherein the one or more wireless identifiers comprises one or more decoy wireless identifiers and one or more unsecured wireless identifiers, wherein the decoy wireless identifier causes computing devices to connect to a decoy wireless network, wherein the decoy wireless network comprises one or more decoy resources;
      identify a secure wireless identifier using the client-side list of one or more secure wireless identifiers; and
      automatically connect to a secure wireless access point through the secure wireless identifier.

2. The system according to claim 1, wherein the computer-readable program code, when executed, further causes the processing device to execute a secure handshake process for retrieving the pre-shared key, comprising:

connecting to a guest wireless network through a guest wireless identifier;

transmitting authentication data to an authentication server; and receiving the pre-shared key from the authentication server.

3. The system according to claim 1, wherein the one or more decoy resources comprises at least one of decoy data or decoy virtual environments.

4. The system according to claim 1, wherein the decoy wireless network is further configured to generate a log of network interactions of the computing devices within the decoy wireless network.

5. The system according to claim 1, wherein the one or more wireless identifiers comprises one or more service set identifiers ("SSID").

6. A computer program product for identification of secure wireless network access points using cryptographic pre-shared keys, the computer program product comprising at least one non-transitory computer readable medium having computer-readable program code portions embodied therein, the computer-readable program code portions comprising executable code portions for:

generating a client-side list of one or more secure wireless identifiers by inputting a pre-shared key into a cryptographic function;

detecting that one or more wireless identifiers are being broadcasted, wherein the one or more wireless identifiers comprises one or more decoy wireless identifiers and one or more unsecured wireless identifiers, wherein the decoy wireless identifier causes computing devices to connect to a decoy wireless network, wherein the decoy wireless network comprises one or more decoy resources;

identifying a secure wireless identifier using the client-side list of one or more secure wireless identifiers; and automatically connecting to a secure wireless access point through the secure wireless identifier.

7. The computer program product according to claim 6, wherein the computer-readable program code portions further comprise executable code portions for executing a secure handshake process for retrieving the pre-shared key, comprising:

connecting to a guest wireless network through a guest wireless identifier;

transmitting authentication data to an authentication server; and receiving the pre-shared key from the authentication server.

8. The computer program product according to claim 6, wherein the one or more decoy resources comprises at least one of decoy data or decoy virtual environments.

9. The computer program product according to claim 6, wherein the decoy wireless network is further configured to generate a log of network interactions of the computing devices within the decoy wireless network.

10. A computer-implemented method for identification of secure wireless network access points using cryptographic pre-shared keys, wherein the computer-implemented method comprises:

generating a client-side list of one or more secure wireless identifiers by inputting a pre-shared key into a cryptographic function;

detecting that one or more wireless identifiers are being broadcasted, wherein the one or more wireless identifiers comprises one or more decoy wireless identifiers and one or more unsecured wireless identifiers, wherein the decoy wireless identifier causes computing devices to connect to a decoy wireless network, wherein the decoy wireless network comprises one or more decoy resources;

identifying a secure wireless identifier using the client-side list of one or more secure wireless identifiers; and automatically connecting to a secure wireless access point through the secure wireless identifier.

11. The computer-implemented method according to claim 10, wherein the computer-implemented method further comprises executing a secure handshake process for retrieving the pre-shared key, comprising:

connecting to a guest wireless network through a guest wireless identifier;

transmitting authentication data to an authentication server; and receiving the pre-shared key from the authentication server.

12. The computer-implemented method according to claim 10, wherein the one or more decoy resources comprises at least one of decoy data or decoy virtual environments.

13. The computer-implemented method according to claim 10, wherein the decoy wireless network is further configured to generate a log of network interactions of the computing devices within the decoy wireless network.

14. The computer-implemented method according to claim 10, wherein the one or more wireless identifiers comprises one or more service set identifiers ("SSID").

* * * * *